(12) United States Patent
Luo

(10) Patent No.: US 10,215,605 B1
(45) Date of Patent: Feb. 26, 2019

(54) CORIOLIS MASS FLOWMETER AND SENSOR ASSEMBLY THEREOF

(71) Applicants: Chengdu Excenith Technology Co., Ltd, Chengdu, Sichuan (CN); Fan Luo, Chengdu, Sichuan (CN)

(72) Inventor: Fan Luo, Sichuan (CN)

(73) Assignees: Chengdu Excenith Technology Co., Ltd., Chengdu, Sichuan (CN); Fan Luo, Chengdu, Sichuan (CN)

( * ) Notice: Subject to any disclaimer, the term of this patent is extended or adjusted under 35 U.S.C. 154(b) by 0 days.

(21) Appl. No.: 15/977,632

(22) Filed: May 11, 2018

(30) Foreign Application Priority Data

Aug. 25, 2017 (CN) .......................... 2017 1 0748650

(51) Int. Cl.
  *G01F 1/84* (2006.01)
(52) U.S. Cl.
  CPC .......... *G01F 1/8486* (2013.01); *G01F 1/8404* (2013.01); *G01F 1/8418* (2013.01); *G01F 1/8427* (2013.01)
(58) Field of Classification Search
  CPC ....................................................... G01F 1/84
  See application file for complete search history.

(56) References Cited

U.S. PATENT DOCUMENTS

| 4,711,132 | A | * | 12/1987 | Dahlin | G01F 1/8422 73/861.356 |
|---|---|---|---|---|---|
| 4,852,409 | A | | 8/1989 | Herzl | |
| 4,957,005 | A | * | 9/1990 | Yard | G01F 1/8413 73/861.355 |
| 5,048,350 | A | * | 9/1991 | Hussain | G01F 1/8413 73/861.355 |
| 5,259,250 | A | * | 11/1993 | Kolpak | G01F 1/74 73/861.355 |
| 5,370,002 | A | | 12/1994 | Normen et al. | |
| 5,551,307 | A | * | 9/1996 | Kane | G01F 1/8413 73/861.356 |
| 6,564,650 | B2 | | 5/2003 | Ollila et al. | |
| 8,215,184 | B2 | | 7/2012 | Lanham et al. | |
| 8,561,479 | B2 | * | 10/2013 | Hagedoorn | G01F 1/8409 73/861.355 |

(Continued)

FOREIGN PATENT DOCUMENTS

CN 1116588 C 7/2003

*Primary Examiner* — Jewel V Dowtin
(74) *Attorney, Agent, or Firm* — Novick, Kim & Lee, PLLC; Allen Xue

(57) ABSTRACT

A sensor assembly for a Coriolis mass flowmeter includes an upstream pipe connection connected to an upstream fluid pipe and a downstream pipe connection connected to a downstream fluid pipe. The sensor assembly installed in a shell of the flowmeter includes a fluid flow pipe, having a fluid input pipe, a fluid output pipe and a double-loop pipe connected in series therebetween; a vibration isolated structure, at least comprising first vibration isolators fixedly arranged on the fluid flow pipe to separate the fluid flow pipe into vibrating pipes and non-vibrating pipes; a weight-increasing structure, arranged on the non-vibrating pipes without contact with the shell; and a connecting structure, fixedly connected to the non-vibrating pipes on one end and to the upstream pipe connection and/or downstream pipe connection on the other to form a flexible connection therebetween.

43 Claims, 5 Drawing Sheets

(56) References Cited

U.S. PATENT DOCUMENTS

2008/0141788 A1 6/2008 Nakao
2011/0094312 A1* 4/2011 Bitto .................... G01F 1/8413
 73/861.355

* cited by examiner

CORIOLIS MASS FLOWMETER AND SENSOR ASSEMBLY THEREOF

TECHNICAL FIELD

The disclosure relates to a Coriolis mass flowmeter, particularly, to a sensor assembly having a double-loop pipe of a fluid flow pipe connected in series and a Coriolis mass flowmeter comprising the sensor assembly.

BACKGROUND

The Coriolis mass flowmeter is a meter used for directly and precisely measuring the flow of fluid. Two parallel U-pipes are arranged in the main body of the typical Coriolis mass flowmeter and allowed to be inversely and synchronously vibrated at a resonant frequency thereof, that is, they may move close to or away from each other at the same time. The fluid entering and flowing through the vibrating pipes subject to synchronous vibration will be forced to be vibrated together. To resist against the forced vibration, the fluid gives an reacting force perpendicular to the flow direction thereof on the vibrating pipes to establish a Coriolis effect, leading to the distortion and deformation of the vibrating pipes and the vibration time difference between the fluid input pipe section and the fluid output pipe section, which is called phase time difference. The difference is proportional to the mass flow of fluid flowing through the vibrating pipes. If the time difference may be measured, the mass flow may be determined accordingly. The Coriolis mass flow meter is manufactured based on such principle.

At present, the instruments may be divided into single-pipe type and double-pipe type by number of vibrating pipes in the sensor. Without diverter, the single-pipe type has equal flows throughout the measuring pipe, easy cleanness and good stability in zero point; however, the single-pipe type is vulnerable to external vibration and only applied by some early products and small-diameter instruments. The double-pipe type realizes the measurement of phase difference between pipes, increases the signal, enhance the linearity, and reduces the influence of external vibration at the same time.

The Coriolis mass flowmeter may be roughly divided into straight-pipe type and elbow-pipe type by the pipe shape structure of a sensor. The straight-pipe type is hard to deposite gas and has a compact and light flow sensor. However, the signal is difficult to detect due to the high self resonant frequency. To limit the self-resonant frequency, the pipes are relatively thin-walled and susceptible to wear damage and corrosion. The elbow-pipe type instrument is provided with a low-rigidity measuring pipe to generate a relatively large signal, and the technology is relatively mature. A thick-walled pipe may be used because of low self-resonant frequency (80-150 Hz). The instrument has relatively good wear resistance and corrosion resistance, and has additive errors caused by easily deposited gas and residues and the requirements for installation space.

The double Π-shape pipe structure is a relatively mature structure in the market. The pipe structure has been the most economical sensor structure, characterized by simple structure, easy processing, moderate sensitivity and strong impact resistance.

However, most of the mass flowmeters applied to the food and medical field are not of the double Π-shape pipe structure. The reasons are shown as follows: the flowmeter for measuring should be free of diverter to meet the sanitary requirements of the food and medical field; and, if a Π-shape pipe only comprises a single pipe, the multi-mode coupling may occur due to the complexity of the internal pipe and affect the performance. Therefore, the mass flowmeters used in the food and medical field should be in single-pipe structure or non-Π structure, which reduces the measurement accuracy and hinders the promotion of the mass flowmeter.

To solve such problem, a Coriolis mass flowmeter having a double Π-shape single-pipe sensor without diverter structure is provided according to the prior art. For example, the Chinese patent No. CN1116588C discloses a Coriolis mass flowmeter comprising a continuous fluid flow pipe, wherein the fluid flow pipe has a double-loop pipe, an input pipe for receiving fluid at the flow-in position, a output pipe for returning the fluid to downstream, and a shell enclosing the double-loop pipe; the flowmeter assembly comprises: a second loop having a first end and a second end and arranged on the fluid flow pipe, wherein the fluid material is received from the second end of the first loop through the first end, and led to the output pipe; a crossover section of the fluid flow pipe, wherein the crossover section leads the fluid from the first loop to the second loop; a fixed connection component fixedly connected to the shell and the fluid flow pipe; and a supporting rod fixedly connected to the first loop and the second loop. According to the full contents disclosed in such patent document, the fixed connection component is mainly used to 1. firmly weld the double-loop pipe to the shell; 2. reduce its minor distortion caused by welding and reduce the impact on double-loop pipe by the distortion with considerable mass; and 3. isolate the vibrating component of the flowmeter and the non-vibrating component installed on the fluid flow pipe.

However, the technical solution of the patent document has the following defects in practical use: 1. for minor distortion caused by welding, the considerable mass of the patent document may not completely eliminate but reduce the impact of the distortion; 2. because the fixed connection component is directly welded to the shell base, and the shell base and the shell cover are made of thick-walled material and welded together, the fixed connection component is rigidly connected to the overall shell and has limited effectiveness in vibration isolation; since the fixed connection component may not eliminate all distortions, some vibration of the vibrating component failing to be counteracted symmetrically releases and leads to unstable zero point and metering performance.

SUMMARY

The objective of the present invention is to provide a Coriolis mass flowmeter and a sensor assembly thereof to overcome the deficiency of stable zero point and metering performance due to limited effect in vibration isolation from the vibrating component to non-vibrating component of the sensor assembly for Coriolis mass flowmeter in the prior art.

Accordingly, in a first aspect, the present invention provides a sensor assembly for a Coriolis mass flowmeter provided, the flowmeter comprising an upstream pipe connection connected to an upstream fluid pipe and a downstream pipe connection connected to a downstream fluid pipe, and the sensor assembly, installed in a shell of the flowmeter, comprises:

a fluid flow pipe, having a fluid input pipe, a fluid output pipe and a double-loop pipe connected in series therebetween;

a vibration isolated structure, at least comprising first vibration isolators fixedly arranged on the fluid flow pipe to separate the fluid flow pipe into vibrating pipes and non-vibrating pipes;

a weight-increasing structure, arranged on the non-vibrating pipes, and the weight-increasing structure and the non-vibrating pipes are not in contact with the shell; and a connecting structure, with one end fixedly connected to the non-vibrating pipes and the other end to the upstream pipe connection and/or downstream pipe connection to form a flexible connection therebetween.

Preferably, the centroid of the sensor assembly moves to the non-vibrating pipes due to the weight-increasing structure.

Preferably, the sensor assembly is characterized in that the weight-increasing structure is a counterweight fixedly installed on the non-vibrating pipes.

Preferably, the fluid flow pipe is made of stainless steel, Hastelloy alloy or titanium alloy; and/or, the material of the counterweight is selected from stainless steel, Hastelloy alloy, titanium alloy and ductile iron.

Preferably, the fluid flow pipe and the counterweight are fixedly connected by welding or mechanical connection.

Preferably, the welding method is brazing or argon arc welding.

Preferably, the mechanical connection is bolted connection.

Preferably, the fluid flow pipe and the counterweight are made of the same material.

Preferably, the counterweight is arranged on the non-vibrating pipes and is away from the roots of the vibrating pipes.

Preferably, the distance between the counterweight arranged on the non-vibrating pipes and the roots of the vibrating pipes accounts for 30% to 50% of the vertically extended length of the non-vibrating pipes.

Preferably, the counterweight is a suspending plate horizontally arranged on the non-vibrating pipes, and the suspending plate is symmetrically arranged in the horizontal direction of the non-vibrating pipes.

Preferably, the suspending plate is a rectangular block with a certain thickness.

Preferably, the minimum length and width of the rectangular block are identical to that of the space formed by the outer edges of the non-vibrating pipes.

Preferably, the thickness of the rectangular block is 0.5-1.5 times of the outer diameter of a single of the non-vibrating pipes.

Preferably, the thickness of the rectangular block is 1 time of the outer diameter of a single of the non-vibrating pipes.

Preferably, the counterweight is a suspending plate horizontally arranged on the non-vibrating pipes, and the suspending plate is asymmetrically arranged in the horizontal direction of the non-vibrating pipes.

Preferably, the counterweight comprises sub-counterweights arranged on the left and right non-vibrating pipes, and the sub-counterweights are arranged symmetrically in the horizontal direction.

Preferably, the double-loop pipe comprises a first loop having a fluid material input end and a first connecting end and a second loop having a fluid material output end and a second connecting end, and the first connecting end is connected to the second connecting end.

Preferably, the fluid material input end and the fluid material output end are arranged in a same horizontal plane, below which the suspending plate is arranged on the non-vibrating pipes.

Preferably, the suspending plate is provided with a first through-hole, a second through-hole and a third through-hole for the first loop to get through, and with a fourth through-hole, a fifth through-hole and a sixth through-hole for the second loop to get through according to flow direction of the fluid material in the fluid flow pipe, wherein the second through-hole and the third through-hole for the first loop are symmetrically arranged on the left and right sides of the rear edge of the suspending plate, the fourth through-hole and the fifth through-hole for the second loop are symmetrically arranged on the left and right sides of the front edge of the suspending plate, and the first through-hole for the first loop and the sixth through-hole for the second loop are symmetrically arranged between the other through-holes.

Preferably, the connecting structure comprises: a connecting beam horizontally arranged in relative to the non-vibrating pipes, with at least an axial end fixedly connected to the corresponding upstream pipe connection or downstream pipe connection; and an intermediate connecting structure with one end fixedly connected to the counterweight and the other end to the connecting beam.

Preferably, the intermediate connecting structure comprises a connecting column vertically arranged in relative to the connecting beam, with an end fixedly connected to the counterweight and the other end to the connecting beam by a cantilever.

Preferably, the connecting columns are two bolts that are symmetrically arranged in the horizontal direction of the non-vibrating pipes.

Preferably, the connecting columns are formed integrally with the cantilever.

Preferably, the intermediate connecting structure is fixedly arranged on the fluid flow pipe and located on the second vibration isolators under the first vibration isolators, and the second vibration isolators are fixedly connected to the non-vibrating pipes on one end and to the connecting beam on the other.

Preferably, the connecting beam is in a cylindrical structure.

Preferably, the axial ends of the cylindrical connecting beam are fixedly connected to the corresponding upstream pipe connection and the downstream pipe connection.

Preferably, the cylindrical connecting beam comprises the curved connecting plates in front and rear of the fluid flow pipe, the upper and lower sides of the curved connecting plates form a first pass-through slot and a second pass-through slot, and the fluid flow pipe gets through the cylindrical connecting beam through the first pass-through slot and the second pass-through slot.

Preferably, the curved edges on both axial ends of the curved connecting plates are adapted to the shape of welding face of the corresponding upstream pipe connection or the downstream pipe connection.

Preferably, the connecting beam is coaxially arranged with the upstream pipe connection and the downstream pipe connection.

Preferably, the connecting structure is fixedly arranged on the fluid flow pipe and located on the second vibration isolators under the first vibration isolators, the second vibration isolators have extended parts orientating to the corresponding upstream pipe connection and/or downstream pipe connection, and the extended parts are fixedly connected to the corresponding upstream pipe connection and/or downstream pipe connection.

Preferably, the first vibration isolators and the second vibration isolators are in a sheet structure with through-holes for the fluid flow pipe to get through, and the first vibration isolators and the second vibration isolators are fixedly connected to the fluid flow pipe through the through-holes.

Preferably, the weight-increasing structure is a pipe extension of the non-vibrating pipes in the direction opposite to the vibrating pipes.

Preferably, the upstream pipe connection and the downstream pipe connection are fixedly connected to the shell of the flowmeter; and the other end of the connecting structure is fixedly connected to the shell.

Preferably, the fluid flow pipe is integrally formed.

Preferably, the fluid input pipe is generally of S-shape, comprising a first bend and a second bend arranged in the direction of fluid flow and bending to the opposite directions.

Preferably, the first bend and the second bend are round-curved.

Preferably, the first bend has a maximum bending radius no more than a half of the bending radius of the second bend.

Preferably, the fluid input pipe further comprises a straight pipe arranged between the first bend and the second bend and/or the second bend and the double-loop pipe.

Preferably, the fluid output pipe is axially symmetric to the fluid input pipe.

In a second aspect, the present invention provides a Coriolis mass flowmeter, comprising:
a shell; and
a sensor assembly installed in the shell; and the sensor assembly is the sensor assembly mentioned above.

Preferably, the flowmeter further comprises an upstream pipe connection and a downstream pipe connection fixedly arranged on both sides of the shell in a horizontal plane, and the upstream pipe connection is coaxially arranged with the downstream pipe connection; the upstream pipe connection is connected to an upstream fluid pipe on one end and to the fluid input pipe on the other end; the downstream pipe connection is connected to a downstream fluid pipe on one end and to the fluid output pipe on the other end.

The present invention has the following advantages:

1. The sensor assembly according to the present invention, first, comprises a fluid flow pipe without diverter structure and having a double-loop pipe connected in series. Without diverter structure, the sensor assembly using the fluid flow pipe may be widely applied in the fields requiring a Coriolis mass flowmeter without diverter structure, for example, a sanitary Coriolis mass flowmeter; second, according to analysis of vibration isolation, the sensor assembly according to the present invention has the weight-increasing structure arranged on the non-vibrating pipes of the fluid flow pipe, and has the connecting structure arranged to realize the flexible connection between the non-vibrating pipes and the upstream pipe connection and/or downstream pipe connection of the flowmeter, so as to isolate the vibration from the vibrating pipes to non-vibrating pipes thereof; and vibration isolating conditions may be met by adjusting the weight of the weight-increasing structure and connection mode of the flexible connection rather than making considerable change in mass, such as to reduce the weight of overall sensor. The weight-increasing structure is arranged on the non-vibrating pipes according to the present invention to shift the center of gravity of the sensor assembly, improve the vibration state, and reduce the vibration coupling of the non-vibrating pipes and the vibrating pipes; in combination with the flexible connection between the non-vibrating pipes and the flowmeter shell, a good vibration isolation effect is achieved, which is favorable for obtaining a stable zero point and excellent metering performance of the flowmeter.

2. The weight-increasing structure of the sensor assembly according to the present invention is a counterweight fixedly installed on the non-vibrating pipes, wherein the counterweight is characterized by simple structure, easy processing, little increased cost, stable zero point and excellent metering performance, thus it is advantageous in marketing and mass production.

3. The sensor assembly according to the present invention obtains good welding and physical properties by connecting the counterweight and the fluid flow pipe of the same material by welding, which is favorable for improving the stability and metering performance of the sensor assembly.

4. The counterweight and the fluid flow pipe of the sensor assembly according to the present invention may also be made of different materials and fixedly connected in mechanical manner. The mechanical fixing methods are various and relatively flexible, and the environmental pollution and human injury caused by welding may be avoid.

5. The sensor assembly according to the present invention comprises the counterweight arranged on the non-vibrating pipes away from the joints between the roots of the vibrating pipes and the non-vibrating pipes, allowing vibration isolation effect between the vibrating pipes and the non-vibrating pipes increases with the distance from the counterweight to the measuring pipe for flow measurement. With the configuration, a low-mass counterweight may be used to meet the required metering performance of the sensor assembly, save material and reduce the cost.

6. The sensor assembly according to the present invention comprises a substantially S-shape rectification pipe connecting the fluid input end of the fluid input pipe to the first connecting end to rectify the fluid before entering the vibrating pipes, so as to substantially eliminate the non-center deviation issue in flow field in the vibrating pipe. In addition to rectifying the fluid before entering the vibrating pipes, the S-shape rectification pipe according to the present invention comprising two round-curved bends at a radius angle of 90° allows the fluid direction at the fluid input end of the fluid input pipe to be perpendicular to the fluid direction at the vibrating pipe. The fluid input end is at a horizontal position and the vibrating pipes at a vertical position, which is also the basic requirement for the fluid flow pipe of the Coriolis mass flowmeter.

7. Compared with the double-loop pipe having diverter structure, the sensor assembly according to the present invention is in an integrally formed structure, which is easier to be welded, and reduces the welding operations required and the distortion of fluid flow pipe caused by welding.

BRIEF DESCRIPTION OF THE DRAWINGS

The features and advantages of the present invention will be more readily understood in combination with drawings, and the drawings are schematic drawings and should not be used to limit the present invention, wherein.

DESCRIPTION OF FIGURES IN THE DRAWINGS

1—upstream pipe connection; 2—downstream pipe connection; 3—shell; 31—opening of upstream pipe connection; 32—opening of downstream pipe connection; 4—fluid flow pipe; 41—fluid input pipe; 411—horizontal input pipe section; 412—first bend; 413—second bend; 414—turning bend; 42—fluid output pipe; 421—horizontal output pipe section; 47—vibrating pipes; 48—non-vibrating pipes; 5—first vibration isolators; 6—second vibration isolators; 61—extended parts; 7—weight-increasing structure; 71—suspending plate; 711—first through-hole; 712—second through-hole; 713—third through-hole; 714—fourth through-hole; 715—fifth through-hole; 716—sixth through-hole; 72—sub-counterweights; 8—connecting structure; 81—connecting beam; 811—curved connecting plates; 812—first pass-through slot; 813—second pass-through slot; 821—connecting column; 822—cantilever.

DETAILED DESCRIPTION OF THE EMBODIMENT

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of flowmeters and sensor assemblies consistent with aspects related to the invention.

Figure 1:
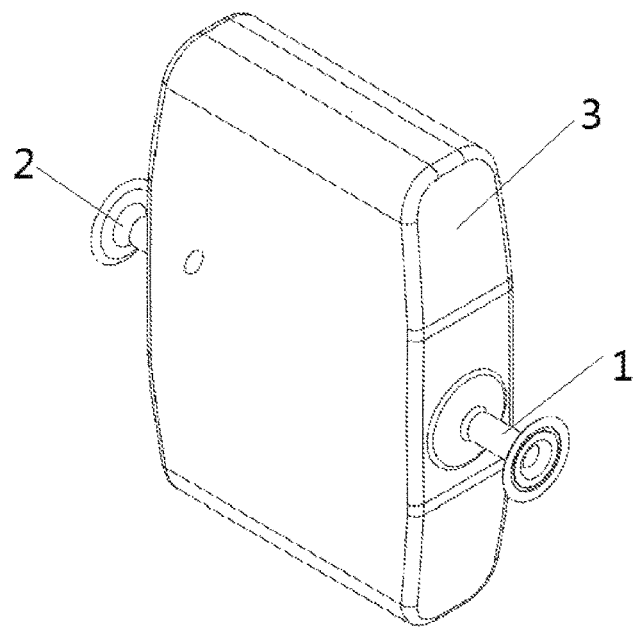
FIG. 1 is a configuration view of a Coriolis mass flowmeter according to an embodiment of the present invention.
Figure 2:
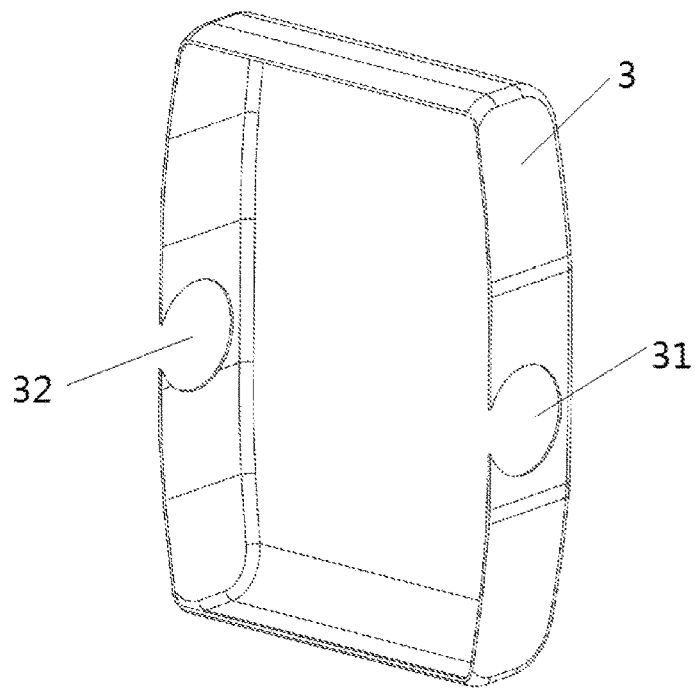
FIG. 2 is a structural view of a partially cut off shell of a Coriolis mass flowmeter.
Figure 3:
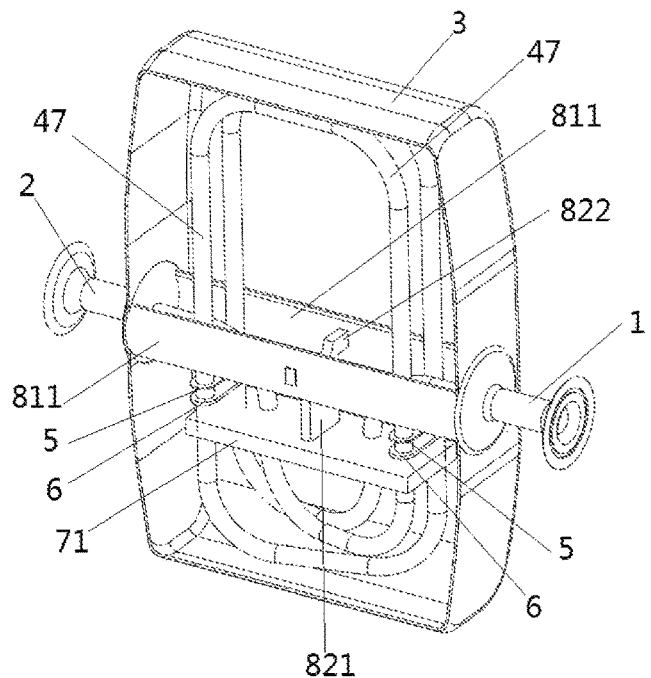
FIG. 3 is a structural view of a Coriolis mass flowmeter according to an embodiment of the present invention on the basis of the shell structure in FIG. 2.

As shown in FIG. 1 to FIG. 3, the example provides a Coriolis mass flowmeter, comprising an upstream pipe connection 1, a downstream pipe connection 2, a shell 3, a fluid flow pipe 4, an actuating device, a detecting device, a vibration isolated structure and a weight-increasing structure 7. The fluid flow pipe 4 is installed in the shell 3, and the vibration isolated structure is installed on the fluid flow pipe 4 to separate the fluid flow pipe 4 into vibrating pipes 47 and non-vibrating pipes 48; the actuating device and the detecting device are installed on the fluid flow pipe 4, wherein the actuating device is used to drive the vibrating pipes 47 to vibrate and force the fluid entering and flowing through the vibrating pipes to vibrate together; to resist against the forced vibration, the fluid gives an reacting force perpendicular to the flow direction thereof on the vibrating pipes 47, leading to the vibration time difference between the fluid input pipe section and the fluid output pipe section, which is called phase time difference; the detecting device is used to detect the phase time difference to determine the mass flow passing through the fluid flow pipe 4. An opening of upstream pipe connection 31 adapting to the outer contour of the upstream pipe connection and an opening of downstream pipe connection 32 to the outer contour of the downstream pipe connection are molded on both sides of the shell 3; the upstream pipe connection 1 and the downstream pipe connection 2 are welded to the corresponding opening of upstream pipe connection 31 and the opening of downstream pipe connection 32 of the shell 3. The Coriolis mass flowmeter according to the embodiment will be described in detail in combination with accompanied drawings.

First, the Fluid Flow Pipe 4 According to the Embodiment is Described.

Figure 4:
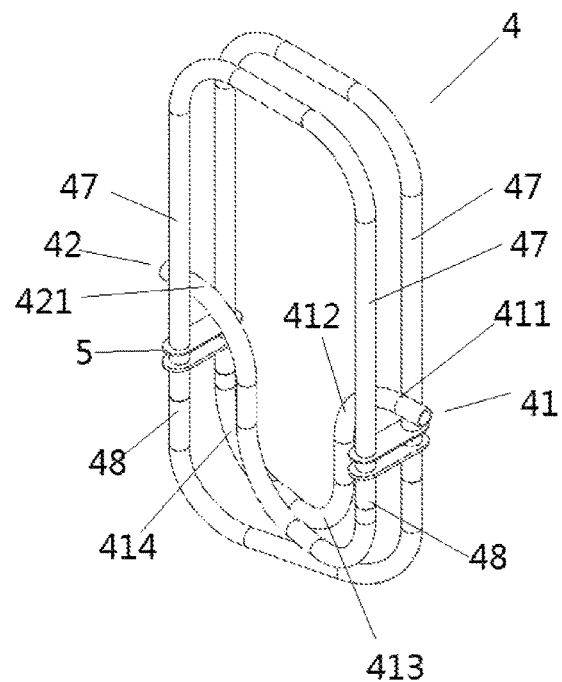
FIG. 4 is a structural view of a fluid flow pipe of a Coriolis mass flowmeter according to an embodiment of the present invention.

As shown in FIG. 4, the fluid flow pipe 4 according to the embodiment comprises a fluid input pipe 41 connected to the upstream pipe connection 1 to receive the fluid material, a fluid output pipe 42 to the downstream pipe connection to output the fluid material, and a double-loop pipe therebetween. The double-loop pipe comprises a first loop connected to the fluid input pipe 41, a second loop connected to the fluid output pipe 42 and a crossover pipe therebetween; the first loop and the second loop are arranged in parallel, specifically, the plane of the first loop is parallel with that of the second loop.

It may be seen from the description above that the fluid flow pipe 4 according to the embodiment is a double-pipe fluid flow pipe 4 integrally formed and having the same advantages as the double-pipe fluid pipe in the prior art; in addition, the fluid flow pipe 4 according to the embodiment is free of diverter structure because it is a double-loop pipe arranged in series, that is a double loop formed by a pipe coiled in a unique mode, which may be applied in the fields requiring a Coriolis mass flowmeter without diverter structure, for example, a sanitary Coriolis mass flowmeter. Because the fluid flow pipe 4 free of diverter structure requires no welding of diverter structure, the fluid flow pipe 4 according to the embodiment is easier to be welded with less operations, compared with the double-pipe fluid flow pipe 4 having diverter structure in the prior art.

The fluid flow pipe 4 is connected to the upstream pipe connection 1 on one end and to the downstream pipe connection 2 on the other end, specifically, the fluid input pipe 41, the double-loop pipe and the fluid output pipe 42 are connected in series from the upstream pipe connection 1 to the downstream pipe connection 2. One end of the fluid input pipe 41 is a fluid input end and the other is a first connecting end; one end of the fluid output pipe 42 is a fluid output end and the other is a second connecting end; the double loop is connected between the first connecting end and the second connecting end.

In the present embodiment, the vibration isolated structure is installed on the fluid flow pipe 4, in which the vibration isolated structure separates the fluid flow pipe 4 into the vibrating pipes 47 above and the non-vibrating pipes 48 below. Because the input/output direction of fluid is angled to the vibrating pipes 47, the fluid should pass through a turning bend 414 of the first loop pipe before entering the vibrating pipes 47; the turning bend 414 decelerates the fluid flowing through inner side and accelerates the fluid through outer side, so as to shift the fluid velocity center outward; similar to the velocity distribution of parabola, the fluid would be flung to the outer side of the arc by centrifugal force during turning. Therefore, the flow field distribution of the fluid flowing through the vibrating pipes 47 is an eccentric parabola, leading to change in sensitivity of the vibrating pipes 47 and affecting the metering performance thereof.

In order to solve the deficiency of the fluid flow pipe 4, a substantially S-shape rectification pipe is arranged between the fluid input end and the first connecting end of the fluid input end 41 of the fluid flow pipe 4 according to the embodiment; route of the S-shape rectification pipe is consistent with the fluid flow direction, comprising a first bend 412 and a second bend 413 bending to opposite directions; the first bend 412 is arranged near the fluid input end, and the second bend 413 near the first connecting end. The second bend 413 and the turning bend 414 bend to the same direction, the second bend 413 and turning bend 414 are right-turn bend, and the first bend 412 is a left-turn bend. When fluid flows through the first bend 412, the flow field would be eccentric to the right side of arc, and then rectified through the second bend 413 and the turning bend 414 to improve the uniformity of flow field and ensure that the flow field enters the vibrating pipes 47 in a basically non-center deviation state after passing the three bends. The S-shape rectification pipe according to the embodiment is arranged on the fluid input pipe 41 to rectify the fluid before entering the vibrating pipes 47 and allow the flow fluid to pass through the vibrating pipes 47 uniformly, so as to improve the metering performance of the vibrating pipes 47.

Preferably, the first bend 412, the second bend 413 and the turning bend 414 are round-curved bends at a 90-degree arc. In the present embodiment, the bending radius of the second bend 413 equals that of the turning bend 414, and the bending radius of the first bend 412 equals a half of the radius of the second bend 413. In addition to rectifying the fluid before entering the vibrating pipes 47, the pipe coiled in a unique mode turns the first bend 412, the second bend 413 and the turning bend 414 at 90°, allows the fluid direction at the fluid input end of the fluid input pipe 41 to be perpendicular to the fluid direction at the vibrating pipes 47. The fluid input end is at a horizontal position and the vibrating pipes 47 at a vertical position, which is also the basic requirement for the fluid flow pipe 4 of the Coriolis mass flowmeter. As a preferred embodiment of the present invention, the first bend 412 and the second bend 413 of the fluid input pipe 41 are two continuous bends bending to the opposite directions, and the second bend 413 is directly connected to the turning bend 414. That is, the present embodiment realizes the rectification completely depending on the bend structures. As a preferred embodiment of the present invention, the fluid output pipe 42 is axially symmetric to the fluid input pipe 41 in horizontal direction, that is, an S-shape pipe is also arranged on the fluid output pipe 42 to allow the fluid flow pipe 4 to be a symmetrical structure in horizontal direction in the shell 3 of Coriolis mass flowmeter.

The fluid input pipe 41 according to the embodiment further comprises a horizontal input pipe section 411 connected to the upstream fluid pipe, the fluid output pipe 42 comprises a horizontal output pipe section 421 to the downstream fluid pipe, and the horizontal input pipe section 411 and the horizontal output pipe section 421 are arranged on an axis. However, the present invention is not restricted to the same axis; in other embodiments, the horizontal input pipe section 411 and the horizontal output pipe section 421 may be located on the same plane but not share the same axis.

The fluid flow pipe 4 according to the embodiment is made of stainless steel, Hastelloy alloy or titanium alloy.

As a variant form of the rectification pipe of the present invention, the fluid input pipe 41 comprises the straight pipes arranged between the first bend 412 and the second bend 413, and between the second bend 413 and the turning bend 414; both straight pipes may rectify the fluid, for example, uniform flow field; considering the rectification effect of both straight pipes, the bending radius of the first bend 412 should be less than a half of the second bend 413, and the bending radius of the second bend 413 should equal the turning bend 414 to ensure that the fluid enters the vibrating pipes 47 at a uniform velocity.

It should be noted that the variant form comprising only one straight pipe is also available. If only one straight pipe is provided, the bending radius of the first bend 412 should be adjusted and kept less than a half of the radius of the second bend 413.

As a variant form of the rectification pipe of the present invention, the first bend 412, the second bend 413 and the turning bend 414 may also be the non-circular bends with various curvature, wherein the fluid flow pipe 4 is hard to be machined, but may rectifies the fluid before entering the vibrating pipes 47.

Then the Weight-Increasing Structure 7 According to the Embodiment is Described.

As shown in FIG. 3, the weight-increasing structure 7 according to the embodiment is a counterweight fixedly installed on the non-vibrating pipes 48, wherein the material of the counterweight is selected from stainless steel, Hastelloy alloy, titanium alloy and ductile iron. Preferably, the counterweight and the fluid flow pipe 4 are made of the same material and fixed by welding. The welding method is brazing or argon arc welding.

In the present embodiment, as shown in FIG. 3, the counterweight of the embodiment, specifically, is a suspending plate 71 horizontally arranged on the non-vibrating pipes 48, and the suspending plate 71 is symmetrically arranged in the horizontal direction of the non-vibrating pipes 48; specifically, because the fluid flow pipe 4 according to the embodiment is a double-loop pipe, the left end of the suspending plate 71 is fixedly connected to the non-vibrating pipes 48 of the both first loop and second loop at left side, and the right end of the suspending plate 71 is fixedly connected to the non-vibrating pipes 48 of the both first loop and second loop at right side. The non-vibrating component of the sensor assembly is weighted by arrangement of the counterweight. It is beneficial for isolation from the vibrating component to the non-vibrating component of the sensor assembly, improvement of the metering performance of the sensor assembly and achievement of stable zero point. The counterweight is characterized by simple structure, easy processing and low cost. That is, the addition of counterweight according to the embodiment significantly improves the metering performance with a little increased cost, thus it is advantageous in marketing and mass production As shown in FIG. 3, the suspending plate 71 is a rectangular block with a certain thickness, and the minimum length and width of the rectangular block are identical to that of the space formed by the outer edges of the non-vibrating pipes 48. In other words, the minimum length of the rectangular block should not be less than the distance between the outermost tips of the left and right non-vibrating pipes 48, and the minimum width of the rectangular block should not be less than the distance between the outermost tips of the front and rear non-vibrating pipes 48 on the same side. When the Coriolis mass flowmeter is used at relative high temperature, if the suspending plate 71 has a heat capacity different from the fluid flow pipe 4, a deformation stress may be directly generated therebetween to affect the performance; the above mentioned arrangement according to the embodiment substantially makes the heat capacity of the suspending plate 71 and the fluid flow pipe 4 uniform to ensure the performance.

As a preferred embodiment of the present invention, the thickness of the rectangular block equals the outer diameter of a single pipe of the non-vibrating pipes 48. However, the present invention is not restricted to equality, the thickness of the rectangular block of other embodiments may be 0.5, 0.8, 1.2 or 1.5 times of the outer diameter of a single pipe of the non-vibrating pipes 48.

The suspending plate 71 according to the embodiment is arranged on the non-vibrating pipes 48 and is away from the roots of the vibrating pipes 47. According to analysis of vibration isolation, to reach the same metering performance, the required mass of suspending plate 71 arranged on the non-vibrating pipes 48 is decreased with the distance to the roots of the vibrating pipes 47, so as to save the material. Specifically, in the embodiment, the distance between the suspending plate 71 arranged on the non-vibrating pipes 48 and the roots of the vibrating pipes 47 accounts for 50% of the vertically extended length of the non-vibrating pipes 48. However, the present invention is not restricted to 50%, in other embodiments, the distance between the suspending plate 71 arranged on the non-vibrating pipes 48 and the roots of the vibrating pipes 47 accounts for 30%, 40% or 45% of the vertically extended length of the non-vibrating pipes 48.

Figure 9:
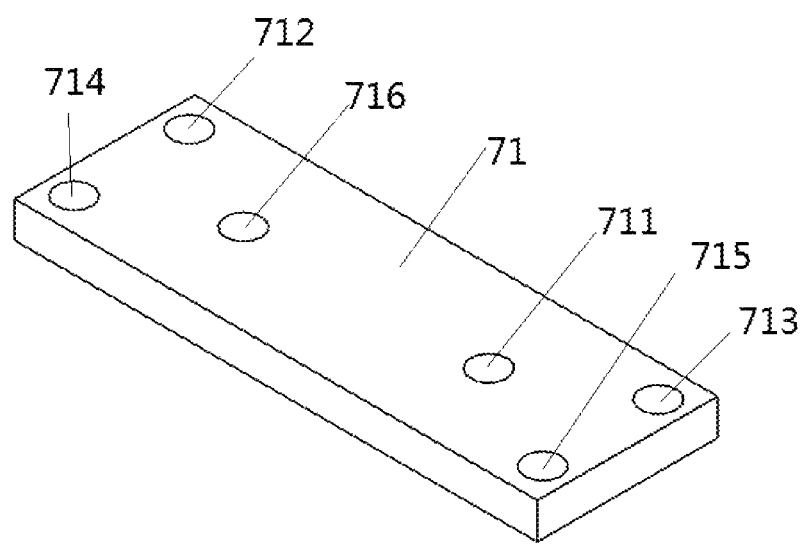
FIG. 9 is a structural view of a suspending plate of a Coriolis mass flowmeter according to an embodiment of the present invention.

The FIG. 9 shows the suspending plate 71 symmetrically arranged in relative to the fluid flow pipe 4 in the horizontal direction. The suspending plate 71 is provided with a first through-hole 711, a second through-hole 712 and a third through-hole 713 for the first loop to get through, and with a fourth through-hole 714, a fifth through-hole 715 and a sixth through-hole 716 for the second loop to get through according to flow direction of the fluid material in the fluid flow pipe 4, wherein the second through-hole 712 and the third through-hole 713 for the first loop are symmetrically arranged on the left and right sides of the rear edge of the suspending plate 71, the fourth through-hole 714 and the fifth through-hole 715 for the second loop are symmetrically arranged on the left and right sides of the front edge of the suspending plate 71, and the first through-hole 711 for the first loop and the sixth through-hole 716 for the second loop are symmetrically arranged between the other through-holes. The sensor assembly is structured symmetrically for relative good metering performance.

Figure 5:
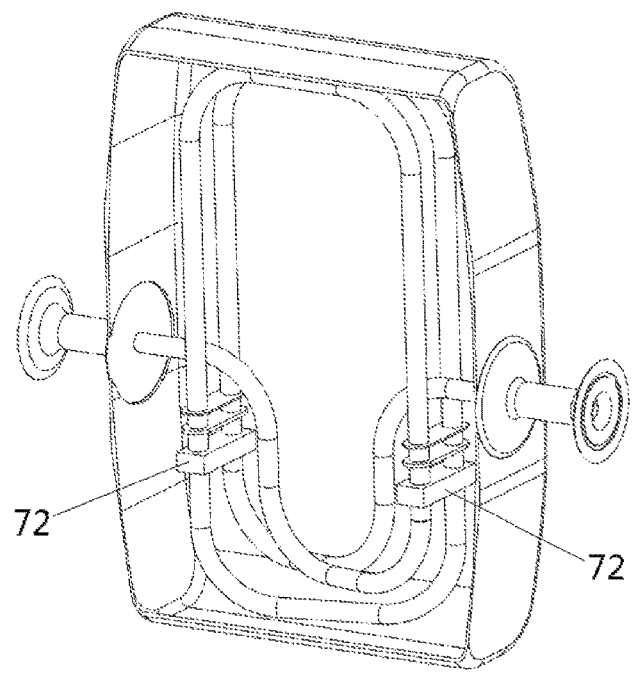
FIG. 5 is a structural view of a Coriolis mass flowmeter according to another embodiment of the present invention.

As a variant form of the weight-increasing structure 7 according to the embodiment, FIG. 5 shows the counterweight in separated structure. That is, a pair of sub-counterweights 72 are arranged on both sides of the non-vibrating pipes 48, wherein either of the sub-counterweights 72 is fixedly and symmetrically arranged in relative to two non-vibrating pipes 48 on the same side; the pair of sub-counterweights 72 on different sides are symmetrically arranged on the non-vibrating pipes 48 in horizontal direction.

Figure 6:
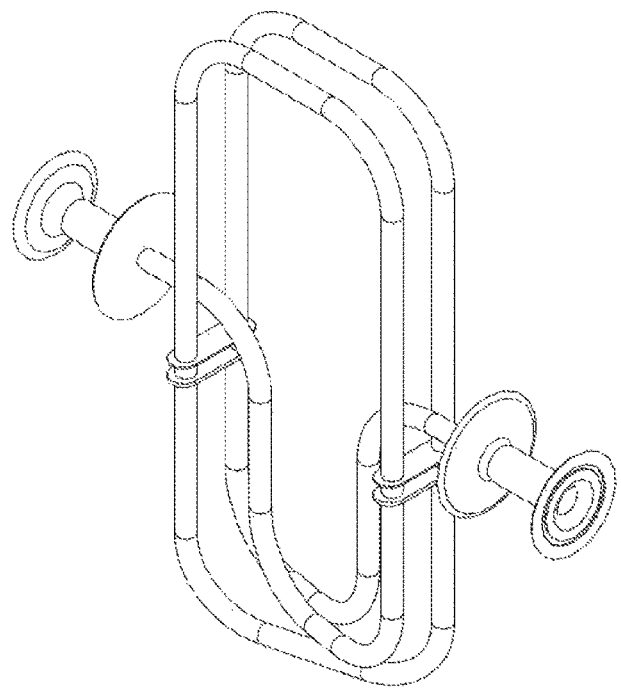
FIG. 6 is a structural view of a fluid flow pipe of a Coriolis mass flowmeter according to another embodiment of the present invention.

As a variant form of the weight-increasing structure 7 according to the embodiment, FIG. 6 shows the method for weighting by using the weight-increasing structure 7 irrelevant to counterweight. For example, the weight-increasing structure 7 comprises pipes extending from the non-vibrating pipes 48 in the reverse direction to the vibrating pipes 47. The non-vibrating component of the sensor assembly may also be weighted by extending the non-vibrating pipes 48.

In Addition, a Connecting Structure 8 According to the Embodiment is Described.

In the present embodiment, on the basis of weighting the non-vibrating component, the metering performance of the sensor assembly is significantly improved by flexibly connecting the non-vibrating component with the shell 3 of the Coriolis mass flowmeter.

As a preferred embodiment of the present invention, FIG. 3 shows the connecting structure 8 comprising a connecting beam 81 and an intermediate connecting structure, wherein the connecting beam 81 is horizontally arranged in relative to the non-vibrating pipes 48, with at least an axial end fixedly connected to the corresponding upstream pipe connection 1 or downstream pipe connection 2; and the intermediate connecting structure is fixedly connected to the suspending plate 71 on one end and to the connecting beam 81 on the other.

Specifically, the connecting beam 81 is in a cylindrical structure, wherein the axial ends of the cylindrical connecting beam 81 are fixedly connected to the corresponding upstream pipe connection 1 and the downstream pipe connection 2. Preferably, the fixed connection method should be welding. The cylindrical connecting beam 81 comprises curved connecting plates 811 in front and rear of the fluid flow pipe 4, the upper and lower sides of the curved connecting plates 811 form a first pass-through slot 812 and a second pass-through slot 813, and the fluid flow pipe 4 gets through the cylindrical connecting beam 81 through the first pass-through slot 812 and the second pass-through slot 813. The cylindrical connecting beam 81 is coaxially arranged with the upstream pipe connection 1 and the downstream pipe connection 2.

The cylindrical connecting beam 81 is connected to the suspending plate 71 through the intermediate connecting structure, wherein the suspending plate 71 is fixedly installed on the non-vibrating pipes 48. As a preferred embodiment of the present invention, the intermediate connecting structure is a connecting column 821 vertically arranged in relative to the connecting beam 81, and the connecting column 821 is fixedly connected to the suspending plate 71 on one end and to the connecting beam 81 on the other end through a cantilever 822. The suspending plate 71 is located below the axis of the horizontal input pipe section 411 and the horizontal output pipe section 421. The connecting column 821 and the cantilever 822 may be integrally formed or separated. If the non-vibrating pipes 48 vibrate, the vibration is transferred to the suspending plate 71 fixedly arranged thereon and to the connecting beam 81 through the connecting column 821 successively, then the vibration is transferred to the upstream/downstream pipe connection 2. The arrangement of the suspending plate 71, the connecting column 821, the cantilever 822 and the connecting beam 81 extends the path of releasing vibration energy from the non-vibrating pipes 48 and helps to further improve the metering performance of the fluid flow pipe 4.

The curved edges on both axial ends of the curved connecting plates 811 of the cylindrical connecting beam 81 are adapted to the shape of welding face of the corresponding upstream pipe connection 1 or the downstream pipe connection 2, so as to facilitate welding and secure the connection.

Figure 7:
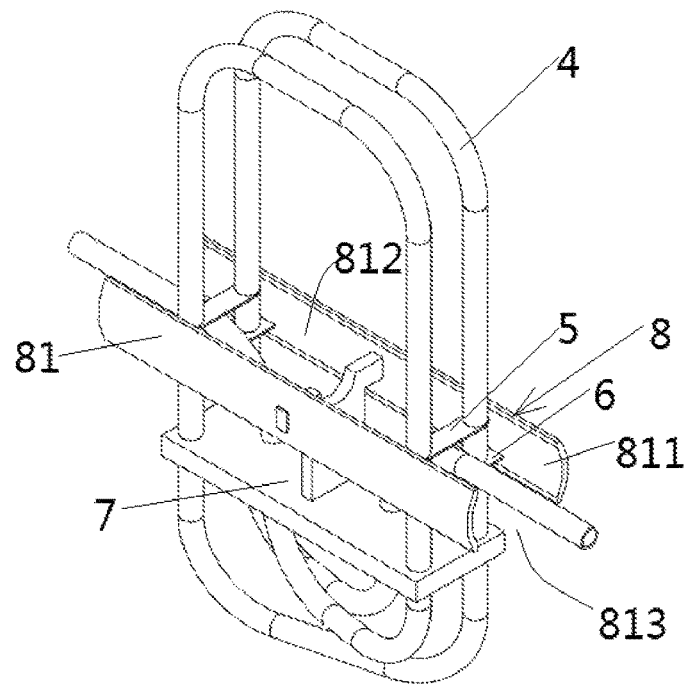
FIG. 7 is a structural view of an assembly of a fluid flow pipe, a weight-increasing structure and a connecting structure of a Coriolis mass flowmeter according to another embodiment of the present invention.
Figure 8:
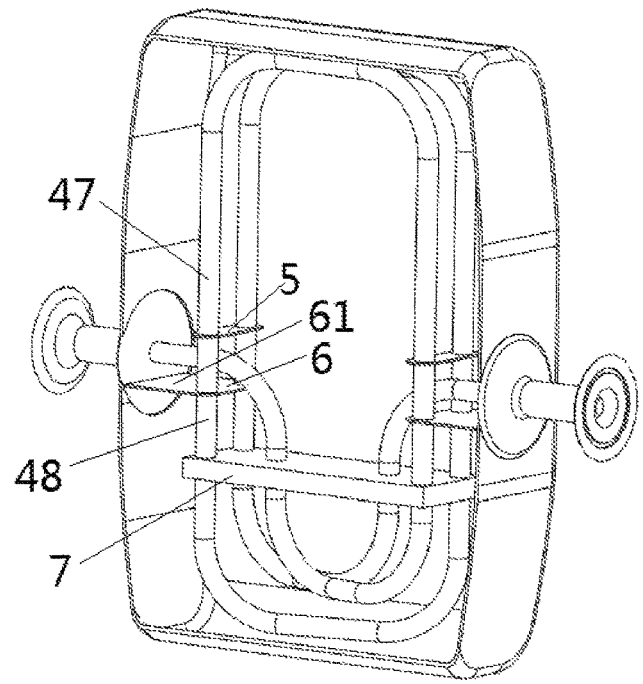
FIG. 8 is a structural view of a fluid flow pipe of a Coriolis mass flowmeter according to another embodiment of the present invention.

As a variant form of the connecting structure 8 according to the embodiment, the connecting structure 8, as shown in FIG. 7, is second vibration isolators 6 fixedly arranged on the fluid flow pipe 4 and below first vibration isolators 5, wherein the second vibration isolators 6 have extended parts 61 arranged toward and fixedly connected to the corresponding upstream pipe connection 1 and/or the downstream pipe connection 2. Specifically, the extended parts are fixedly welded to the corresponding upstream pipe connection 1 and/or the downstream pipe connection 2.

As an alternative to the embodiment, bolts may be used as the connecting column 821 of the intermediate connecting structure. In practical application, two bolts are arranged, wherein the lower ends of the bolts are in threaded connection with or fixedly connected to the suspending plate 71 by nuts, the upper ends of both bolts are fixed on the cantilever 822 by thread or welding, and the cantilever 822 is fixedly connected to the cylindrical connecting beam 81.

As an alternative to the embodiment, the connecting beam 81 may be in a non-cylindrical structure and comprise non-curved connecting plates. In one of the alternative embodiments, the axial edges of the connecting plates are straight edges. The connecting plates may be axially extended in straight shape or curve shape.

Finally, the Vibration Isolated Structure According to the Embodiment is Described.

As shown in FIG. 3 to FIG. 8, the vibration isolated structure comprises the first vibration isolators 5 welded on the fluid flow pipe 4 to separate it into the vibrating pipes 47 and the non-vibrating pipes 48 and the second vibration isolators 6 arranged below the first vibration isolators 5; both of the first vibration isolators 5 and the second vibration isolators 6 are sheets provided with through-holes for the fluid flow pipe 4 to get through, and the first vibration isolators 5 and the second vibration isolators 6 are welded to the fluid flow pipe 4 on the through-holes.

It should be stated that, the first vibration isolators and the second vibration isolators may be fixedly connected to the fluid flow pipe 4 by welding and mechanical connection.

The number of the vibration isolators is not restricted to two. Third vibration isolators and fourth vibration isolators may be further arranged below the second vibration isolators 6 in other embodiments.

The invention described and claimed herein is not to be limited in scope by the specific preferred embodiments disclosed herein, as these embodiments are intended as illustrations of several aspects of the invention. Although several embodiments have been showed and described in combination with drawings, those skilled in the art should understand that various changes and modifications may be made to the present invention without departing from the spirit and scope of the present invention, and such changes and modifications are also intended to fall within the scope of the appended claims.

The invention claimed is:

1. A sensor assembly for a Coriolis mass flowmeter, characterized in that the flowmeter comprises an upstream pipe connection connected to an upstream fluid pipe and a downstream pipe connection connected to a downstream fluid pipe, and the sensor assembly, installed in a shell of the flowmeter, comprises:
    a fluid flow pipe, having a fluid input pipe, a fluid output pipe and a double-loop pipe connected in series therebetween;
    a vibration isolated structure, at least comprising first vibration isolators fixedly arranged on the fluid flow pipe to separate the fluid flow pipe into vibrating pipes and non-vibrating pipes;
    a weight-increasing structure, arranged on the non-vibrating pipes, and the weight-increasing structure and the non-vibrating pipes are not in contact with the shell; and
    a connecting structure, with one end fixedly connected to the non-vibrating pipes and the other end to the upstream pipe connection and/or downstream pipe connection to form a flexible connection therebetween.

2. The sensor assembly of claim 1, characterized in that a centroid of the sensor assembly moves to the non-vibrating pipes due to the weight-increasing structure.

3. The sensor assembly of claim 1, characterized in that the weight-increasing structure is a counterweight fixedly installed on the non-vibrating pipes.

4. The sensor assembly of claim 3, characterized in that the fluid flow pipe is made of stainless steel, Hastelloy alloy or titanium alloy; and/or, the material of the counterweight is selected from stainless steel, Hastelloy alloy, titanium alloy and ductile iron.

5. The sensor assembly of claim 4, characterized in that the fluid flow pipe and the counterweight are fixedly connected by welding or mechanical connection.

6. The sensor assembly of claim 5, characterized in that the welding method is brazing or argon arc welding.

7. The sensor assembly of claim 5, characterized in that the mechanical connection is bolted connection.

8. The sensor assembly of claim 3, characterized in that the fluid flow pipe and the counterweight are made of the same material.

9. The sensor assembly of claim 3, characterized in that the counterweight is arranged on the non-vibrating pipes and is away from the roots of the vibrating pipes.

10. The sensor assembly of claim 9, characterized in that the distance between the counterweight arranged on the non-vibrating pipes and the roots of the vibrating pipes accounts for 30% to 50% of the vertically extended length of the non-vibrating pipes.

11. The sensor assembly of claim 3, characterized in that the counterweight is a suspending plate horizontally arranged on the non-vibrating pipes, and the suspending plate is symmetrically arranged in the horizontal direction of the non-vibrating pipes.

12. The sensor assembly of claim 11, characterized in that the suspending plate is a rectangular block with a certain thickness.

13. The sensor assembly of claim 12, characterized in that the minimum length and width of the rectangular block are identical to that of the space formed by the outer edges of the non-vibrating pipes.

14. The sensor assembly of claim 12, characterized in that the thickness of the rectangular block is 0.5-1.5 times of the outer diameter of a single pipe of the non-vibrating pipes.

15. The sensor assembly of claim 14, characterized in that the thickness of the rectangular block is 1 time of the outer diameter of a single pipe of the non-vibrating pipes.

16. The sensor assembly of claim 3, characterized in that the counterweight is a suspending plate horizontally arranged on the non-vibrating pipes, and the suspending plate is asymmetrically arranged in the horizontal direction of the non-vibrating pipes.

17. The sensor assembly of claim 3, characterized in that the counterweight comprises sub-counterweights arranged on the left and right non-vibrating pipes, and the sub-counterweights are arranged symmetrically in the horizontal direction.

18. The sensor assembly of claim 11, characterized in that the double-loop pipe comprises a first loop connected to the fluid input pipe and a second loop connected to the fluid output pipe, the plane of the first loop is parallel to that of the second loop, and the first loop is connected to the second loop by a crossover pipe.

19. The sensor assembly of claim 18, characterized in that the fluid input pipe has a horizontal input pipe section connected to the upstream fluid pipe, the fluid output pipe has a horizontal output pipe section connected to the downstream fluid pipe, and the horizontal input pipe section and the horizontal output pipe section are arranged on an axis.

20. The sensor assembly of claim 19, characterized in that the suspending plate is arranged below the axis.

21. The sensor assembly of claim 18, characterized in that the suspending plate is provided with a first through-hole, a second through-hole and a third through-hole for the first loop to get through, and with a fourth through-hole, a fifth through-hole and a sixth through-hole for the second loop to get through according to flow direction of the fluid material in the fluid flow pipe, wherein the second through-hole and the third through-hole for the first loop are symmetrically arranged on the left and right sides of the rear edge of the suspending plate, the fourth through-hole and the fifth through-hole for the second loop are symmetrically arranged on the left and right sides of the front edge of the suspending plate, and the first through-hole for the first loop and the sixth through-hole for the second loop are symmetrically arranged between the other through-holes.

22. The sensor assembly of claim 3, characterized in that the connecting structure comprises:
   a connecting beam, horizontally arranged in relative to the non-vibrating pipes, with at least an axial end fixedly connected to the corresponding upstream pipe connection or downstream pipe connection; and
   an intermediate connecting structure, with one end fixedly connected to the counterweight and the other end to the connecting beam.

23. The sensor assembly of claim 22, characterized in that the intermediate connecting structure comprises:
   a connecting column, vertically arranged in relative to the connecting beam, with an end fixedly connected to the counterweight and the other end to the connecting beam by a cantilever.

24. The sensor assembly of claim 23, characterized in that the connecting columns are two bolts that are symmetrically arranged in the horizontal direction of the non-vibrating pipes.

25. The sensor assembly of claim 24, characterized in that the connecting columns are formed integrally with the cantilever.

26. The sensor assembly of claim 22, characterized in that the intermediate connecting structure is fixedly arranged on the fluid flow pipe and located on the second vibration isolators under the first vibration isolators, and the second vibration isolators are fixedly connected to the non-vibrating pipes on one end and to the connecting beam on the other.

27. The sensor assembly of claim 22, characterized in that the connecting beam is in a cylindrical structure.

28. The sensor assembly of claim 27, characterized in that the axial ends of the cylindrical connecting beam are fixedly connected to the corresponding upstream pipe connection and the downstream pipe connection.

29. The sensor assembly of claim 27, characterized in that the cylindrical connecting beam comprises the curved connecting plates in front and rear of the fluid flow pipe, the upper and lower sides of the curved connecting plates form a first pass-through slot and a second pass-through slot, and the fluid flow pipe gets through the cylindrical connecting beam through the first pass-through slot and the second pass-through slot.

30. The sensor assembly of claim 29, characterized in that the curved edges on both axial ends of the curved connecting plates are adapted to the shape of welding face of the corresponding upstream pipe connection or the downstream pipe connection.

31. The sensor assembly of claim 22, characterized in that the connecting beam is coaxially arranged with the upstream pipe connection and the downstream pipe connection.

32. The sensor assembly of claim 1, characterized in that the connecting structure is fixedly arranged on the fluid flow pipe and located on the second vibration isolators under the first vibration isolators, the second vibration isolators have extended parts orientating to the corresponding upstream pipe connection and/or downstream pipe connection, and the extended parts are fixedly connected to the corresponding upstream pipe connection and/or downstream pipe connection.

33. The sensor assembly of claim 26, characterized in that the first vibration isolators and the second vibration isolators are in a sheet structure with through-holes for the fluid flow pipe to get through, and the first vibration isolators and the second vibration isolators are fixedly connected to the fluid flow pipe through the through-holes.

34. The sensor assembly of claim 1, characterized in that the weight-increasing structure is a pipe extension of the non-vibrating pipes in the direction opposite to the vibrating pipes.

35. The sensor assembly of claim 1, characterized in that the upstream pipe connection and the downstream pipe connection are fixedly connected to the shell of the flowmeter; and the other end of the connecting structure is fixedly connected to the shell.

36. The sensor assembly of claim 1, characterized in that the fluid flow pipe is integrally formed.

37. The sensor assembly of claim 1, characterized in that the fluid input pipe is generally of S-shape, comprising a first bend and a second bend arranged in the direction of fluid flow and bending to the opposite directions.

38. The sensor assembly of claim 37, characterized in that the first bend and the second bend are round-curved.

39. The sensor assembly of claim 38, characterized in that the first bend has a maximum bending radius no more than a half of the bending radius of the second bend.

40. The sensor assembly of claim 37, characterized in that the fluid input pipe further comprises a straight pipe arranged between the first bend and the second bend and/or the second bend and the double-loop pipe.

41. The sensor assembly of claim 1, characterized in that the fluid output pipe is axially symmetric to the fluid input pipe.

42. A Coriolis mass flowmeter comprising:
   a shell; and
   a sensor assembly of claim 1 installed in the shell.

43. The sensor assembly of claim 42, further comprising an upstream pipe connection and a downstream pipe connection fixedly arranged on both sides of the shell in a horizontal plane, and the upstream pipe connection is coaxially arranged with the downstream pipe connection; the upstream pipe connection is connected to an upstream fluid pipe on one end and to the fluid input pipe on the other end; the downstream pipe connection is connected to a downstream fluid pipe on one end and to the fluid output pipe on the other end.

* * * * *